United States Patent [19]

Bunger

[11] Patent Number: 4,476,809
[45] Date of Patent: Oct. 16, 1984

[54] COOLING SYSTEM FOR CATTLE CONFINEMENT PENS

[76] Inventor: Richard E. Bunger, 5202 E. Washington St., Phoenix, Ariz. 85034

[21] Appl. No.: 471,196

[22] Filed: Mar. 1, 1983

[51] Int. Cl.³ .............................................. A01K 1/00
[52] U.S. Cl. ..................................... 119/16; 119/159
[58] Field of Search .................................. 119/16, 159

[56] References Cited

U.S. PATENT DOCUMENTS

| 3,137,270 | 6/1964 | Rigterink et al. | 119/16 |
| 3,370,571 | 2/1968 | Knapp | 119/159 |
| 3,677,229 | 7/1972 | Blough et al. | 119/16 |
| 3,951,336 | 4/1976 | Miller et al. | 119/16 X |

OTHER PUBLICATIONS

Seath et al., "Effect of Water Sprinkling With and Without Air Movement on Cooling Dairy Cows", 1948, pp. 361–366 Journal of Dairy Science.
American Society of Agricultural Engineers Paper No. 72-423, Morrison et al., 1970-1971.

*Primary Examiner*—Hugh R. Chamblee
*Attorney, Agent, or Firm*—Warren F. B. Lindsley

[57] ABSTRACT

A cooling system for animal confinement pens employing roof-mounted fans and sprinkling head configuration that operate in a predetermined manner to maintain food consumption during high temperature, high humidity conditions without unduly increasing the humidity of the surrounding air.

2 Claims, 4 Drawing Figures

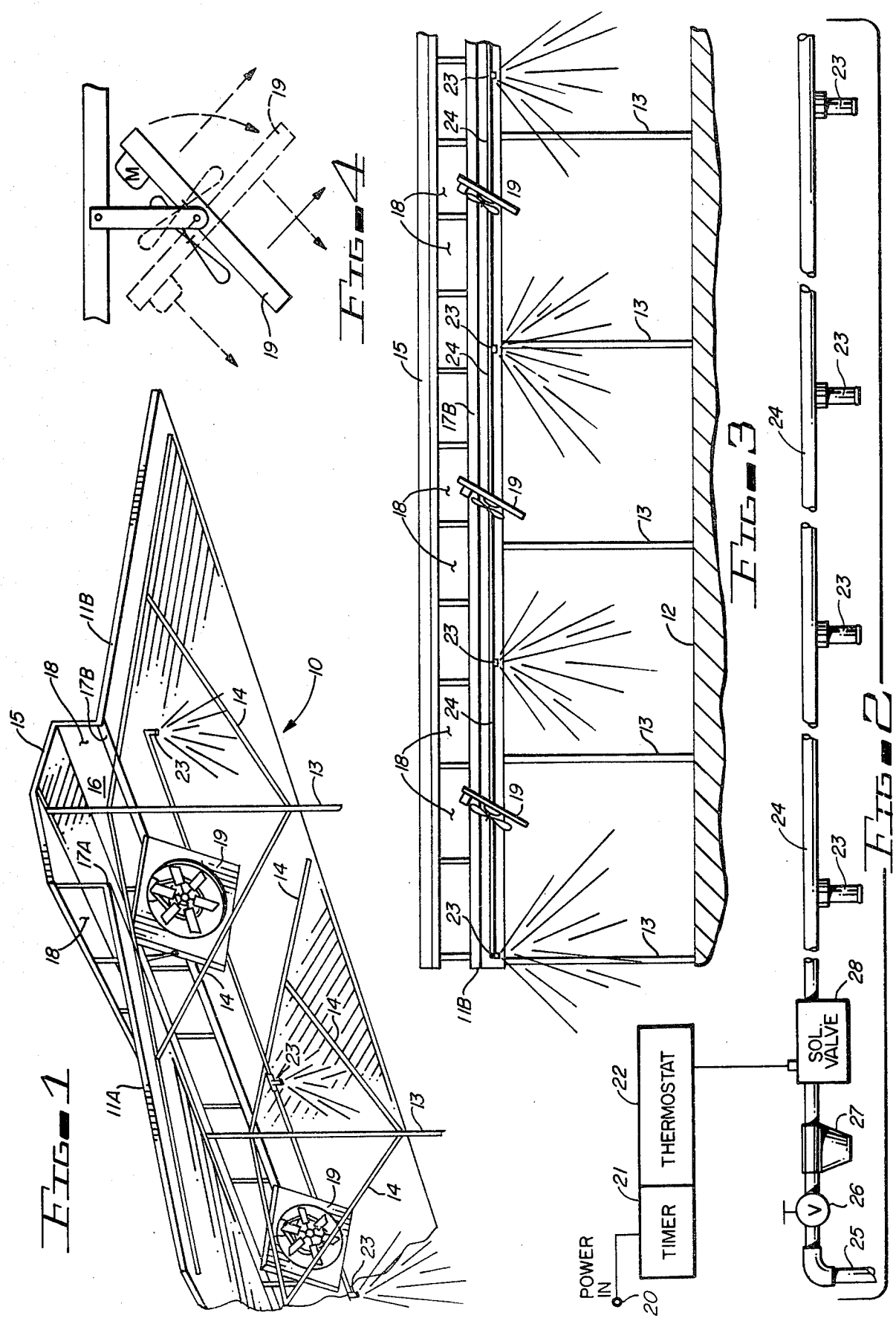

COOLING SYSTEM FOR CATTLE CONFINEMENT PENS

BACKGROUND OF THE INVENTION

In recent years, there has been a trend toward cattle confinement pens, and more recently, toward confinement buildings for raising and converting animals to marketable conditions and for providing a proper environment for milk-producing dairy cows.

Confinement buildings are becoming more and more acceptable for animal conversion and dairy use, but with them, go hand in hand the problems of maintaining healthful and sanitary conditions for the animals housed in such buildings. Not only do the buildings require a carefully coordinated waste removal system, but an adequate cooling and ventilating system is needed to maintain a daily food consumption by the cattle to maintain the average time-growth and/or milk-producing schedule desired regardless of the weather conditions in and out of the building.

It has been noted that during periods of high heat and humidity conditions, cattle become uncomfortable and stressed and, accordingly, significantly reduce their feed consumption. This action reduces the rate of gain in weight for feeders, heifers, breeding and gestating heifers and dry cows and reduces milk production in dairy cows.

Sprinkling systems have been installed in cattle confinement buildings, but they have been difficult to use because they either create a wet, slick area on a concrete cattle-supporting floor or a mud hole in dirt floor pens, as well as increasing humidity in the air, thereby reducing the cooling efficiency of the animals' lungs. In order to avoid the disadvantages of the prior art sprinkling systems, a novel sprinkling system has been developed that, for example, sprinkles large droplets of water on the back of the cattle for approximately one minute approximately every one-half hour during the period under which the cattle are uncomfortable or stressed, due to high temperature and humidity.

This sprinkling action decreases respiratory rates and rectal temperature of the cattle during high temperature and humidity atmospheric conditions, thereby significantly increasing feed consumption and rate of gain with cattle and milk output of associated milking cows.

DESCRIPTION OF THE PRIOR ART

The only known study of the physiological benefit to confined cattle experiencing uncomfortable and/or stress conditions from high temperature and humidity conditions is a study performed by Dr. G. P. Lofgreen at the University of California, Imperial Valley Field Station, over a two-year period during 1970 and 1971 which was reported in the American Society of Agricultural Engineers Paper No. 72-423. This paper reported that sprinkling cattle under shades during the summer in the Imperial Valley of California for one minute every thirty minutes when the temperature was above 80 degrees F. resulted in significantly higher feed consumption and rate of gains compared with cattle under shades and not sprinkled.

SUMMARY OF THE INVENTION

In accordance with the invention claimed, an improved cooling system for cattle shelters or confinement buildings is provided for use in livestock operations wherein the shelter is designed with careful attention given to animal comfort during high temperature and high humidity conditions.

It is, therefore, one object of this invention to provide a new and improved environmental control system for livestock facilities appropriate for use in large and small scale livestock operations.

Another object of the invention is to provide an improved cooling system for animal shelters which will increase feed consumption and dairy milk output during periods of high temperature, high humidity conditions.

A further object of this invention is to provide in the design of such a shelter a special roof-mounted fan and sprinkling configuration which aids in cooling dairy cattle so they will continue to eat their full rations, even during periods of high temperature, thereby maintaining maximum milk production.

Further objects and advantages of the invention will become apparent as the following description proceeds, and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a partial persepective view of an animal shelter employing a combination fan and sprinkling system embodying the invention;

FIG. 2 is a diagrammatic illustration of the plumbing system of the sprinkling system shown in FIG. 1;

FIG. 3 is a partial cross-sectional view of the shelter shown in FIG. 1 illustrating the association of the oscilating fan and sprinkler heads; and FIG. 4 is a partial view of one of the oscillating fans showing in dash lines another position of the fan.

DESCRIPTION OF THE PREFERRED EMBODIMENT

Referring more particularly to the drawing by characters of reference, FIGS. 1 and 3 disclose one embodiment of a building configuration embodying the invention and comprises an animal shelter 10 specifically designed for use in large and small scale livestock operations. The shelter shown comprises two main rectangular roof sections 11A and 11B covering a floor or animal platform 12. Each of the roof sections 11A and 11B slopes at a relatively low pitch upwardly toward the center of the structure and is supported by a plurality of posts 13. Each post 13 is stiffened by a suitable diagonal brace 14 wedged between posts 13 and the underside of roof sections 11A and 11B.

A crown 15 is positioned over the slotted opening 16 at the peak of the shelter running along the juxtapositioned edges 17A, 17B of roof sections 11A and 11B, which may be provided with suitable ventilating openings 18 arranged along its length.

In accordance with the invention disclosed, a sprinkler cooling system is disclosed for use in animal shelter 10 or any other similar suitable cattle confinement building for reducing the body heat of the cattle and milk-producing cows confined in the shelter.

Feeders, heifers, breeding and gestating heifers and dry cows heretofore did not justify the investment and operating costs of prior art cooling systems; however, the disclosed system is inexpensive to construct and operate, thereby justifying its use for this type of cattle in order to reduce their stress and increase their comfort under high temperature, high humidity conditions. The disclosed invention is particularly effective in maintaining the output of milking cows during the periods of high temperature, high humidity conditions.

As shown in the drawing, a combination sprinkling and air-moving system is provided, which comprises one or more electric fans 19, which may be mounted for controlled uniform identical oscillating action along the length of the shelter and as shown in FIGS. 1 and 3, are positioned below the crown of the animal shelter. Other suitable fan mounting positions may be used. The fans are connected to a suitable source of electric power 20 and are energized through a suitable timer 21 and thermostat 22.

A plurality of sprinkler heads 23 are connected to conduit 24, which in turn is connected to a source 25 of water under pressure through a suitable manual cutoff valve 26, mocron filter 27 and solenoid valve 28. The manual cutoff valve should be placed with consideration for a winter time freezing condition. The sprinkler heads should be installed with the capabilities of draining out in the event of cold weather.

As shown, the sprinkler line or conduit 24 is placed overhead in approximately the center of the shelter or in other suitable positions offset from the feeding mangers. The sprinkler line or conduit will be activated by the thermostat 22 which can be set to actuate when a certain temperature in the shelter is reached. The thermostat 22 causes the solenoid valve 28 to open to pressure line or conduit 24. By setting the timer 21, which is interspaced in the line between the thermostat 22 and the solenoid valve 28, the line may be pressurized and the sprinkler heads activated selectively, such as every half hour or at any other repeating interval.

In operation of the system under thermostatic control, the fans are energized first at lower temperature settings and then as the temperature rises the sprinkler heads are activated. Manual override of this sequence is possible at any time by the operator.

The significant fact noted when using the disclosed system is that the animals need to be wetted periodically and then allowed to dry off between sprinklings. As drying by the fans occurs, excess heat is removed from the animals in an evaporative cooling effect. This action is similar to when a human steps out of a swimming pool and is dried by the wind. Animals have been noted to purposely expose themselves to the sprinklers for the cooling effect produced by the evaporative cooling effect.

Most cattle, except the Brama type, do not sweat; consequently, they do not derive a surface evaporative cooling effect, the same as other sweating animals do. By sequentially adding water to the cows' outer surface, and particularly their backs, we are artificially providing them with the effects of a sweating-cooling effect.

It should be noted, for example, that the fans may be operated continuously during high temperature, high humidity conditions and the sprinklers approximately one minute every one-half hour curing the stress period. The sprinkler heads should produce large droplets of water, rather than a fine mist effect, since small droplets or a fine mist increases the humidity of the air around the cattle and decreases their natural lung cooling.

Such action not only reduces the stress of the cattle during high temperature, high humidity conditions, but substantially increases their ration consumption. Tests have proven a 16.93% consumption increase and daily weight imrovement of 24% over the consumption and gain of controlled cattle under the same stress conditions, but not provided with the disclosed cooling effect.

With increased consumption, milking cows can maintain a given milk-producing schedule which they cannot do under stress conditions. Cows will not eat if their temperatures reach a given value. Thus, by reducing their temperatures under high temperature conditions, they will start eating again or maintain their normal eating habits and continue to deliver milk on schedule.

An environmental control system for an animal shelter is thus provided which effectively cools the cattle in accordance with the several stated objects of the invention.

Although but a single embodiment of the present invention has been illustrated and described, it will be apparent to those skilled in the art that various changes and modifications may be made therein without departing from the spirit of the invention or from the scope of the appended claims.

What is claimed is:

1. A cooling system for animal confinement buildings comprising:
   a plurality of spacedly mounted fans arranged in the building above the animals for blowing air over the backs of the animals confined in the building,
   said fans being mounted to oscillate in unison,
   a plurality of sprinkler heads connected to a source of water under pressure mounted in the building, one adjacent each of the fans for directing water droplets onto the backs of the animals in the building, and
   means for controlling the length of time said sprinkler heads are spraying droplets of water on the backs of the animals in a sequential manner in a given relationship to the temperature of the air in the building,
   said sprinkler heads being energized to sprinkle large droplets of water approximately one minute approximately each half hour that the temperature of the air in the building is above a given temperature.

2. The cooling system set forth in claim 1 wherein:
   the fans and sprinkler heads are mounted above the backs of the animals in the building along the longitudinal axis of the building.

* * * * *